Nov. 22, 1960

O. MUSGRAVE 2,960,810

LAWN MOWER CUTTING BLADE CLUTCH MECHANISM

Filed Nov. 22, 1957

INVENTOR
ORLY MUSGRAVE

BY *Toulmin & Toulmin*

ATTORNEYS

Nov. 22, 1960   O. MUSGRAVE   2,960,810
LAWN MOWER CUTTING BLADE CLUTCH MECHANISM
Filed Nov. 22, 1957   2 Sheets-Sheet 2
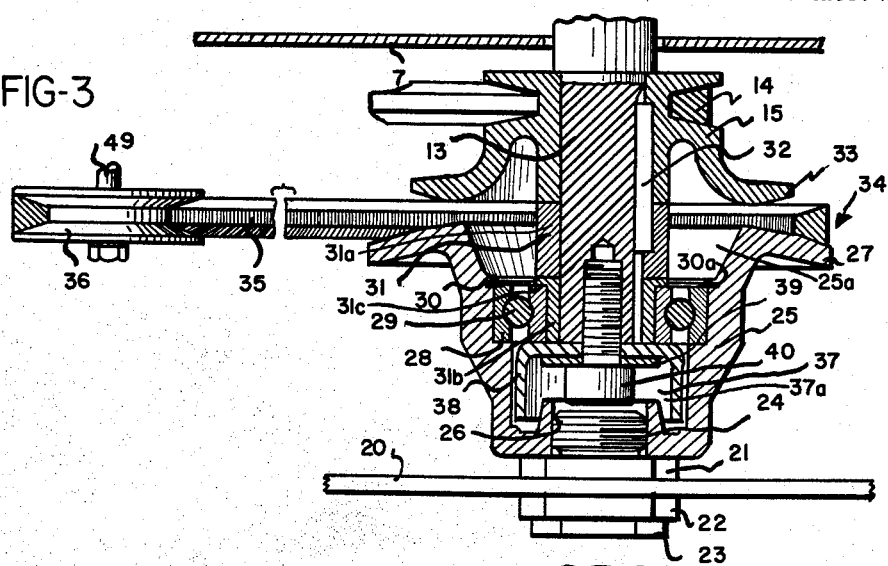
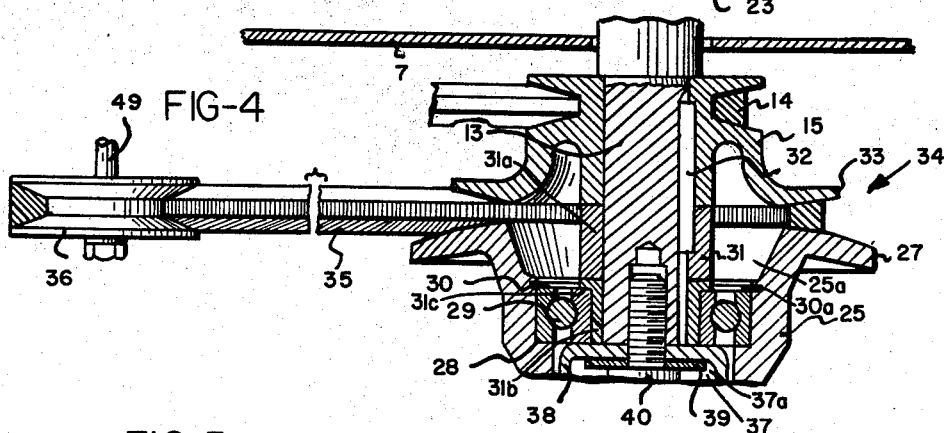
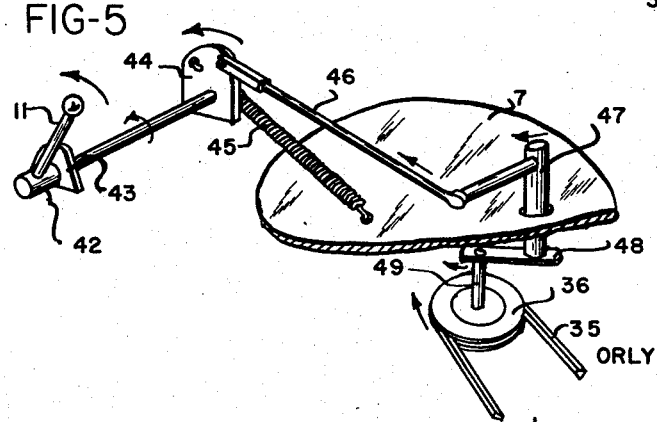
INVENTOR
ORLY MUSGRAVE
BY
ATTORNEYS

2,960,810

LAWN MOWER CUTTING BLADE CLUTCH MECHANISM

Orly Musgrave, 1731 Audobon Park Drive, Springfield, Ohio

Filed Nov. 22, 1957, Ser. No. 698,294

7 Claims. (Cl. 56—25.4)

This invention relates to power lawn mowers and particularly to an improved power mower which has a horizontal rotating cutting blade.

In power lawn mower devices a horizontal rotating cutting blade has in practice been directly driven by a power source such as a gasoline engine. Also horizontal rotating blades have been mounted on spindles separate from the shaft of the power source and driven through belting connecting the shaft of the power source and the spindle. This latter arrangement permits of clutching and declutching the blade but lacks the advantages of direct drive from the power source. In accordance with the present invention a split pulley is carried on the shaft of the power source and one flange of the pulley is directly driven by the shaft. The complementary flange of the split pulley is mounted for rotation with the horizontal cutting blade and a belt which is tightenable at the pleasure of the mower operator passes over the split pulley to occasion clutching of the complementary flange with the driven flange. Thereby the cutting blade is readily clutched and declutched at the will of the operator and the advantages stemming from direct drive from the power source are attainable.

Accordingly a primary object of the present invention is the provision of a power mower in which the axis of rotation of the drive shaft of the power source and the axis of rotation of the cutting blade are the same while providing for declutching of the cutting blade.

An important object of the present invention is to provide for the quick stopping of the cutting blade upon declutching of the blade.

A particular object of the present invention is to provide a belt clutching arrangement for the blade in which the belt effecting the clutching lies in a horizontal plane and is supported by the complementary flange in the non-clutching position.

The invention will be more fully understood by reference to the following detailed description and accompanying drawings wherein:

Figure 3 is a sectional view with parts broken away taken substantially on line 3—3 of Figure 2 and illustrating the clutch device of invention in an inoperative position;

Figure 4 is similar to that of Figure 3 but illustrating the clutch device in an operative position; and Figure 5 is a diagrammatic view illustrating one method of tightening the belt which passes over the split pulleys of Figures 3 and 4.

Figure 1:
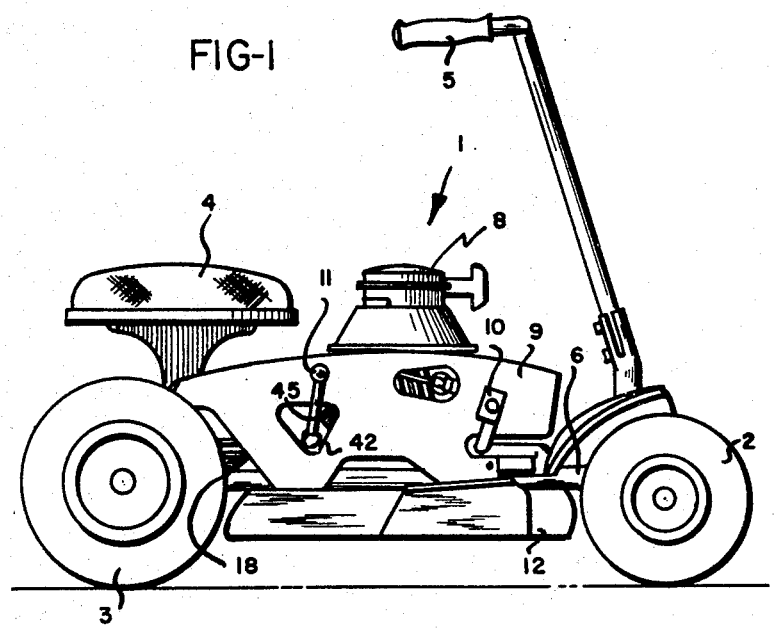
Figure 1 is a right side elevational view of a lawn mower in accordance with the invention.

Referring now to the drawings more in detail, the numeral 1 in Figure 1 generally designates a rider type lawn mower having forward wheels 2 and rearward driving wheels 3. The numeral 4 indicates a seat within easy reach of the steering handle 5. The lawn mower has a frame 6 which supports a plate 7 (Figure 2) on which there is mounted the power source 8 of conventional type, such as a gasoline engine. Partially enclosing the gasoline engine is a hood 9 through which there extends a foot pedal 10 forming a portion of the actuator mechanism of the lawn mower.

The numeral 11 indicates a handle for actuation of the clutching device of this invention. Below the handle 11 and the hood 9 there depends at 12 foot receiving wings. The numeral 13 in Figure 2 designates a vertically depending shaft of the power source 8, which shaft extends through the plate 7.

A belt 14 is trained over a pulley 15 on the shaft 13 and is also trained over a driven pulley 16 and an idler pulley 17. Through the pulley 16 and its associated shaft the motor shaft 13 is operably connected by any suitable means, such as a gear box (not shown) to the chain 18 which passes over the sprocket 19 on the rear axle of the lawn mower carried by the wheels 3.

The details of construction relative to the mode of operating the mower from the power source 8 and the connections of the power source to the shaft are of no importance to the present invention and may take any usual form, and accordingly are not described in further detail.

A blade 20 extends horizontally beneath the mower and as shown in Figure 3 is supported between washers 21, 22 by a bolt 23. The threaded end 24 of bolt 23 is received within a shell or casting 25 in an internally threaded opening 26. The blade is itself non-rotatably mounted on the bolt in any conventional manner as by a hexagonal opening in the blade cooperating with a hexagonal cross-section of the bolt.

The shell 25 is open at its upper end 25a (Figure 3) and is formed on its upper portion as a flange of a pulley. The shell is provided with a shoulder 28 in which there is seated ball bearing 29. A spring retainer 30 positioned in a circular groove 30a of the shell presses the bearing 29 into place on the shoulder. Interposed between the bearing 29 and the shaft 13 is a sleeve 31, enlarged at its upper end 31a and keyed at 32, together with the pulley 15, to the shaft 13; between the enlarged upper end 31a and the lower portion 31b of smaller cross-section there is formed a ridge 31c against which the bearing 29 abuts; thereby movement of the shell or casting 25 in one axial direction is limited.

The casting, which includes the pulley 15, is also provided with a flange 33; flange 27 is complementary to the flange 33, and these flanges together form a split grooved pulley generally indicated at 34 on the shaft 13. The split grooved pulley lies in a horizontal plane, substantially parallel to that of the blade 20. A belt 35 is trained over the split grooved pulley 34 and also over a pulley 36, to which more detailed reference will be made hereinafter.

The numeral 37 designates a spacing between the lower end of the shell 25 and the lower end of the shaft 13. In the spacing and abutting the lower end of shaft 13 and bearing 29 is a guide cup 38 engaged by a washer 39 and retained by a screw 40 which is threaded into the lower end of the shaft. Movement of casting 25 on shaft 13 in the second axial direction is limited by abutment of the cup with the bearing. The spacing 37 is normally filled with grease 37a and this materially assists in overcoming any vibration in the blade 20.

In assembling the clutch guide cup 38 and the washer 39 are positioned suitably within spacing 37; bearing 29 and its retainer ring 30 are then mounted. The assembly is then passed over the smaller portion of sleeve 31 to the position of Figure 3 and thereafter the screw 40 is tightened through opening 26. Blade carrying bolt 23 is then threaded into the casting at the opening 26.

Figure 2:
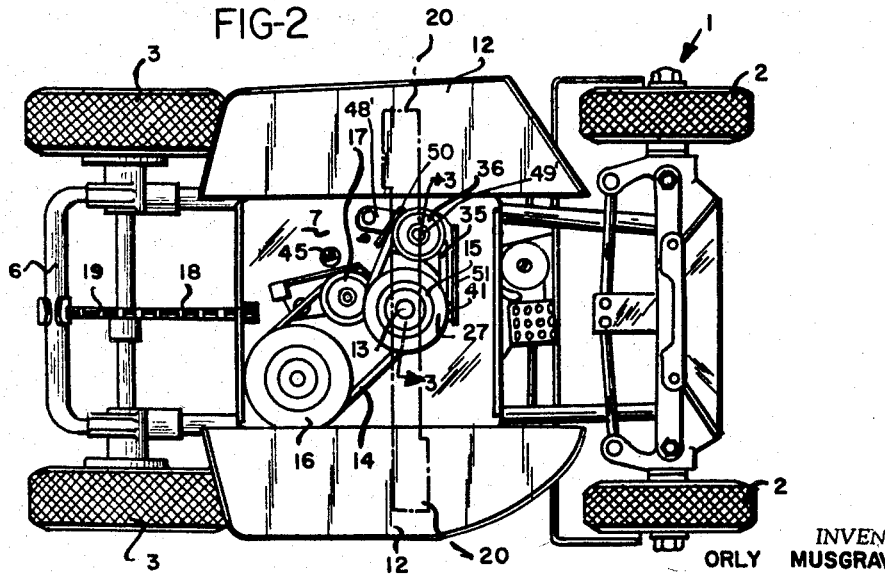
Figure 2 is a bottom plan view of the lawn mower of Figure 1 with parts removed and the blade of the lawn mower illustrated in phantom.

In the structure of Figure 2 pulley 36 mounted on pin 49' is carried by link 48' which itself supports upstanding belt guards 50, 51. Block or brake shoe 41, as shown, is mounted on guard 51 in engagement with flange 27 to aid in braking of flange 27 and accordingly of the cutting blade also (Figure 3). This arrangement is similar to the structure of Figure 5, described hereinafter, differing primarily in the form of link 48'. The block 41 and guards 50, 51 move with pulley 36 when the belt is tightened (Figure 4) and any frictional drag of the block on the pulley in the tightened belt condition is slight, if any engagement exists, particularly since centrifugal force will tend to throw the block outwardly. In the slack condition of the belt, when pulley 36 is moved toward the pulley 15 (Figure 2), the block is biased firmly against the pulley 15, and thus aids in the stopping of the pulley.

As shown in Figure 3 the belt 35 is in a slackened condition and under the influence of gravity lies against the inner face of the flange 27.

Referring now to Figure 4 the belt 35 is illustrated as being in a tensioned condition and drawn well into the groove of the split pulley 34. In this position the shaft 13 powered from the source 8 drives the pulley 15 and the flange 33 in rotation, and the belt 35 gripped between the flanges 27 and 33 occasions rotation of the casting 25 and also of the cutting blade 20 which is secured to the casting 25, as already indicated.

Belt 35 may be tightened and loosened in any of a number of ways. One mode is set forth in Figure 5 wherein the handle 11 (Figure 1 also) is illustrated as pinned to the shaft 42 which rotates in bearing 43. Shaft 42 carries a block 44 to which there is secured a spring 45, the other end of the spring being retained by plate 7. Also secured to the block 44 is a linking system indicated at 46 and which is fastened to a vertical pin 47 rotatably mounted through the plate 7 and secured at its lower end to a link 48. The link 48 at its leftward end in Figure 5 carries a pin 49 which supports the pulley 36. Accordingly, rotation of the handle 11 in the direction indicated by the arrow in Figure 5 is effective to draw the block 44 and the spring 45 attached thereto into an over-centering relation and to rotate the vertical pin 47. Rotation of the pin 47 occasions movement of the link 48 in the direction indicated by the arrow, and accordingly movement of the pulley 36 to tighten the belt 35 passing about the pulley. Thus it is merely necessary for an operator on the seat 4 to reach down and move the handle 11 in a forward or rearward direction to loosen or tighten the belt and thus to declutch or clutch the cutting blade as desired.

It is to be particularly noted that in the inoperative position the belt 35 lies free of the flange 33 and does not undergo any material wear in the course of normal operation. The clutch mechanism has demonstrated its efficiency through many hours of operation.

It will be understood that this invention is susceptible to modification in order to adapt it to different usages and conditions and accordingly, it is desired to comprehend such modifications within this invention as may fall within the scope of the appended claims.

What is claimed is:

1. In a power lawn mower, a frame, a power source on the frame, a driving shaft of the power source extending substantially normal to the ground, a split, grooved pulley axially fixed on the said shaft having one flange secured to the shaft for rotation with the shaft and the other complementary flange of the split pulley supported for rotation relative to the shaft, a belt passing in the groove of the split pulley and normally lying free on the complementary flange, another groove pulley also receiving the said belt, means carried by the lawn mower for tightening the belt on the pulleys to cause the belt to grip on the split pulley, and a horizontally rotating cutting blade supported for rotation with the complementary flange whereby the cutting blade is rotated when the said belt is tightened.

2. In a power lawn mower, a frame, a power source on the frame, a driving shaft of the power source extending substantially normal to the ground, a split grooved pulley axially fixed on the said shaft extending in a horizontal plane having an upper flange secured to the shaft for rotation with the shaft and the other complementary lower flange supported for rotation relative to the shaft, a belt lying in a horizontal plane passing in the groove of the split pulley and normally resting on the complementary flange, another groove pulley also receiving the said belt, means carried by the lawn mower for tightening the belt on the pulleys to cause the belt to grip on the split pulley, and a horizontally rotating cutting blade supported for rotation with the complementary flange whereby the cutting blade is rotated when the said belt is tightened.

3. In a power lawn mower, a frame, a power source on the frame, a driving shaft of the power source extending substantially normal to the ground, a horizontal rotating cutting blade, a split, grooved pulley on the said shaft in a horizontal plane having an upper flange secured to the shaft for rotation with the shaft and the other complementary lower flange supported for rotation relative to the shaft, fixed axially with respect to the shaft and in supporting relation to the cutting blade, a belt lying in a horizontal plane passing in the groove of the split pulley and normally resting on the complementary flange, a belt tightener groove pulley supported by the frame and also receiving the said belt, and means carried by the lawn mower to actuate the tightener pulley to grip the belt on the split pulley to cause the split pulley to rotate and the cutting blade to be driven when the shaft is rotated.

4. In a power lawn mower, a frame, a power source on the frame, a driving shaft of the power source extending normal to the ground, a split, grooved pulley axially fixed on the said shaft extending in a horizontal plane, having an upper flange secured to the shaft for rotation with the shaft and the other complementary lower flange supported for rotation relative to the shaft, a belt lying in a horizontal plane passing in the groove of the split pulley and normally resting on the complementary flange, another groove pulley on the frame also lying in a horizontal plane receiving the said belt and forming a belt tightener pulley, means carried by the lawn mower for actuating the belt tightener pulley to grip the belt on the split pulley, a horizontally rotating cutting blade supported for rotation with the complementary flange whereby the cutting blade is rotated when the said belt is tightened and the power source operated, and throw-out braking means engaging the periphery of the complementary flange and operable to frictionally engage the flange to brake the rotation of the flange when the belt is slackened on the split pulley.

5. In combination, in power transmission mechanism, a frame portion of the mechanism, a power source on the frame portion, a shaft of the power source depending from the frame portion substantially normal to the ground, a shell having an open upper end mounted around the lower end of the shaft axially fixed with respect to the shaft and having a part extending below the shaft, said shell being rotatably mounted with respect to the shaft, means adapted for mounting a cutter blade fixedly on said shell part and for extending said blade in a horizontal plane, a split groove pulley supported on said shaft, said split pulley having an upper flange secured for rotation with the shaft, and a lower flange of the pulley on an upper portion of the shell and complementary to the upper flange, said lower flange being rotatable together with the shell.

6. In combination, in power transmission mechanism, a frame portion of the mechanism, a power source on the frame portion, a shaft of the power source depending from the frame portion substantially normal to the ground, a shell having an open upper end mounted around the lower end of the shaft, said shell having a shoulder in the inner periphery thereof and a peripheral groove above the shoulder, a sleeve secured on the shaft rotatable with the shaft and having an enlarged upper portion forming a ridge with a lower sleeve portion, a retainer ring in the groove of the shell, a bearing on the shoulder of the shell engaged between the shoulder and the ridge and retainer ring, means supporting the bearing upwardly against the ridge preventing movement of the bearing and shell axially of the shaft, a split groove pulley supported on said sleeve, said split pulley having an upper flange secured for rotation with the sleeve and shaft, a lower flange of the split pulley complementary to the upper flange and on an upper portion of the shell, a shell part extending below the shaft, and means adapted for mounting a horizontal cutter blade secured on said part for rotation therewith.

7. In combination, in power transmission mechanism, a frame portion of the mechanism, a power source on the frame portion, a shaft of the power source depending from the frame portion substantially normal to the ground, a shell having an open upper end mounted around the lower end of the shaft, said shell having a shoulder in the inner periphery thereof and a peripheral groove above the shoulder, a sleeve secured on the shaft rotatable with the shaft and having an enlarged upper portion forming a ridge with a lower sleeve portion, a retainer ring in the groove of the shell, a bearing on the shoulder of the shell engaged between the shoulder and the ridge and retainer ring, a shell part extending below the shaft and forming a spacing with the shaft, said part having an opening therethrough to the shaft, a guide cup in the spacing engaging the bearing on the lower side thereof, a screw threaded into the shaft removably retaining the cup in position, a bolt closing the opening of the part and adapted for having a cutter blade secured thereto for rotation therewith, and a split groove pulley supported on said sleeve, axially fixed with respect to said shaft, said pulley having an upper flange secured for rotation with the sleeve and pulley, a lower flange of the split pulley complementary to the upper flange and on an upper portion of the shell whereby said lower flange and a cutter blade secured by said bolt rotate together.

References Cited in the file of this patent

UNITED STATES PATENTS

| | | |
|---|---|---|
| 692,120 | Conner | Jan. 28, 1902 |
| 2,254,592 | Berkeley | Sept. 2, 1941 |
| 2,466,495 | Slemmons | Apr. 5, 1949 |
| 2,548,135 | Worley | Apr. 10, 1951 |
| 2,648,986 | Guyer | Aug. 18, 1953 |
| 2,791,079 | Funk | May 7, 1957 |